Oct. 8, 1940.                C. R. BROWN                2,216,904
                     TREATMENT OF DISTILLERY SLOP
                       Filed Aug. 2, 1938          2 Sheets-Sheet 1
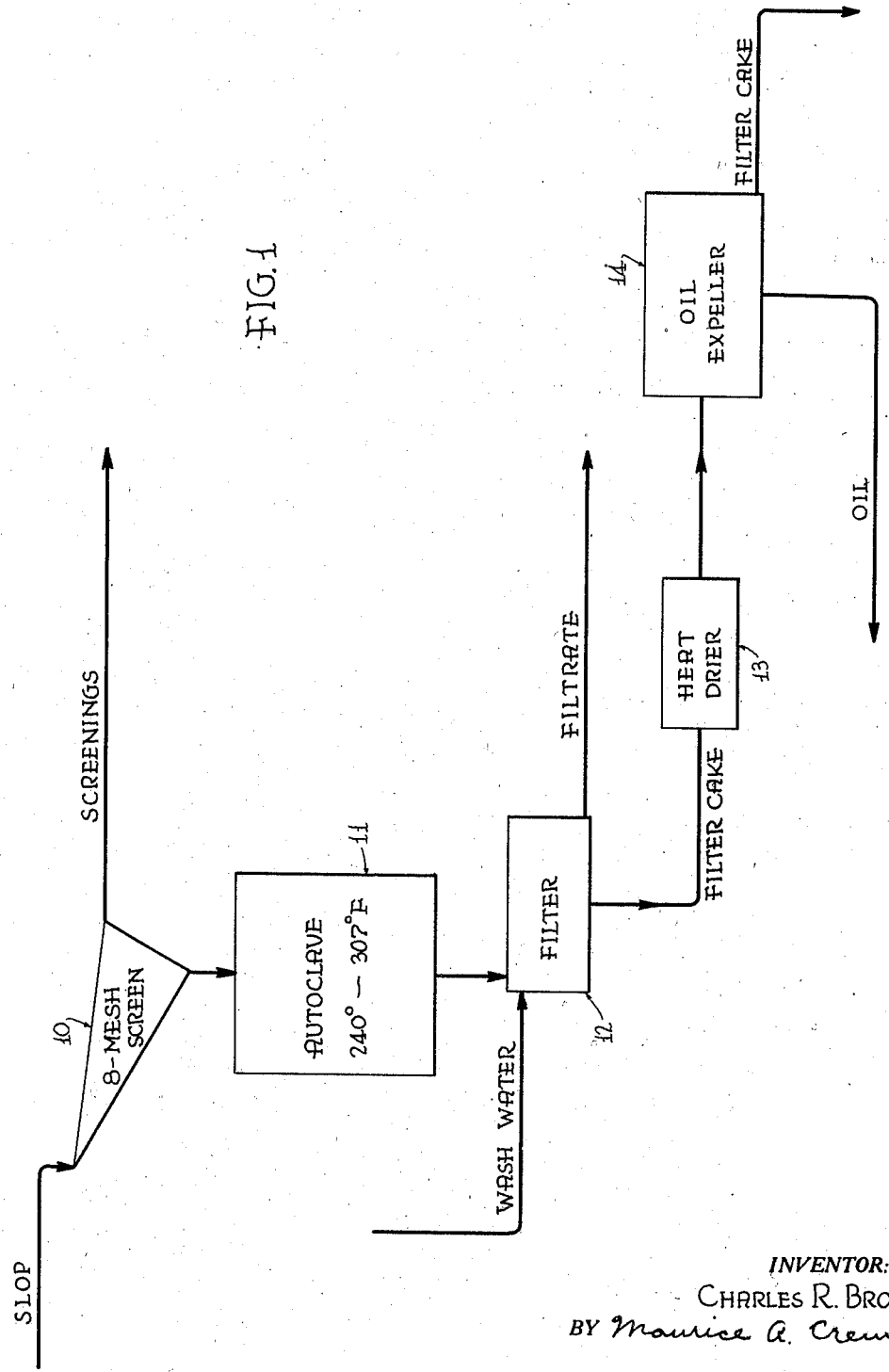
INVENTOR:
CHARLES R. BROWN
BY Maurice A. Crews
ATTORNEY

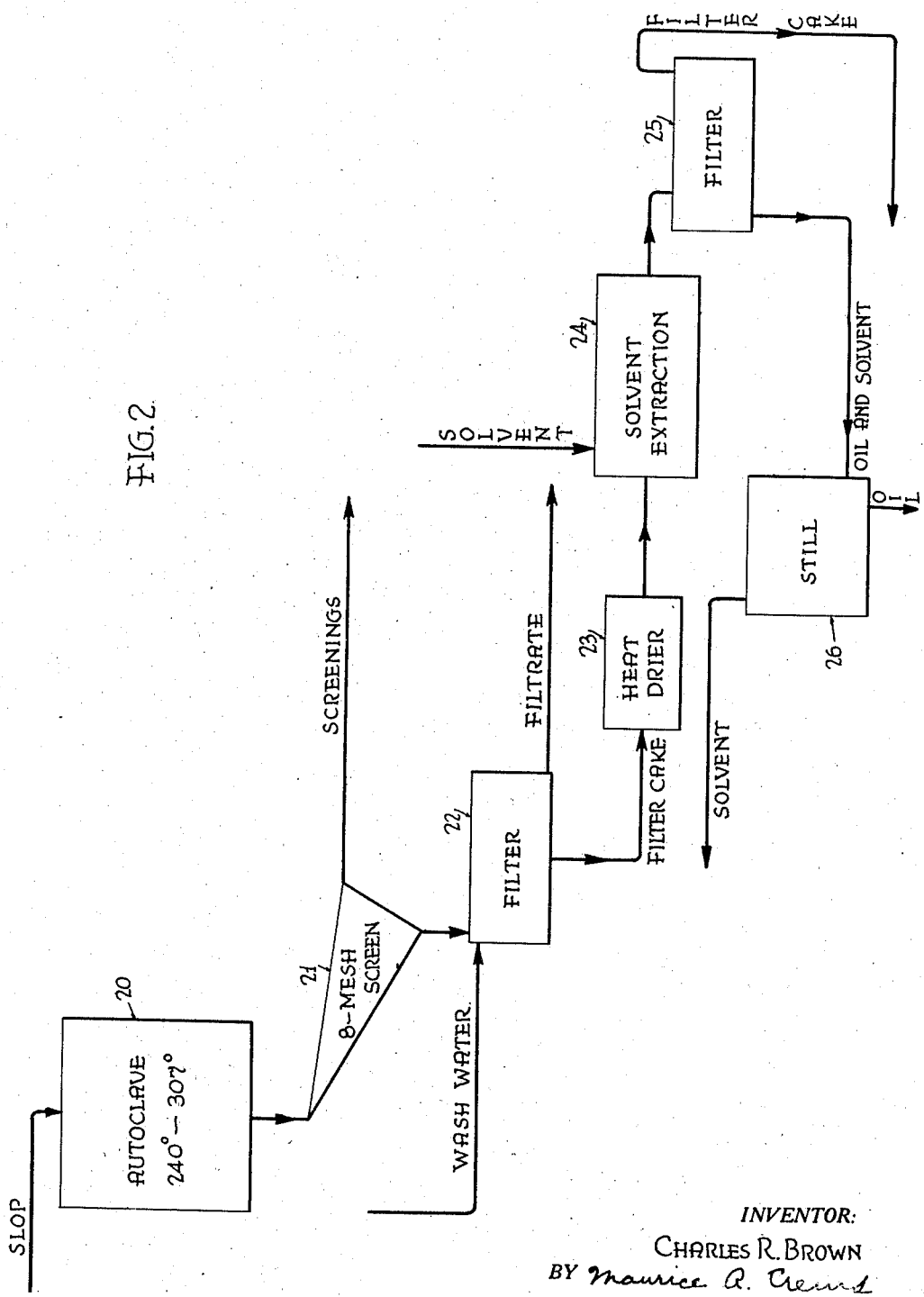

Patented Oct. 8, 1940

2,216,904

UNITED STATES PATENT OFFICE 2,216,904

TREATMENT OF DISTILLERY SLOP

Charles R. Brown, Champaign, Ill., assignor to The Sharples Corporation, a corporation of Delaware Application August 2, 1938, Serial No. 222,640

7 Claims. (Cl. 260—412.5)

The present invention pertains to the treatment of distillery slop. A principal object of the invention has been to separate distillery slop into two or more fractions, to produce a fraction from which vegetable oil can be economically recovered, and to recover vegetable oil from said fraction. This application is a continuation in part of application Serial No. 192,383, filed February 24, 1938.

In the practice of the present invention the separation of the slop into fractions may be accomplished, for example, by filtration. The filtration of distillery slop as heretofore produced has been an impossibility because of the fact that such slop rapidly clogs filter cloths upon any attempt at filtration, thereby rendering continued performance of the filtering operation impossible. A primary object of the invention has been to subject the slop to a preliminary converting operation which obviates this difficulty and renders subsequent filtration and recovery of vegetable oil from the filter cake feasible. The invention is applicable to any type of distillery slop containing vegetable oil.

With the above objects in view, the present invention resides in a process of treating distillery slop obtained by the fermentation of grain to produce alcohol, which comprises heating the slop under pressure sufficient to maintain it liquid at a temperature in excess of 240° F., e. g., between 250° F. and 307° F. until the solids of said slop have been converted to a state in which the slop can be continuously filtered through cloth, and thereafter separating said converted solids from the slop. At least sufficient pressure should be applied during the heating step to maintain the slop liquid at the temperature to which it is heated.

This converting step may be accomplished, on a typical Bourbon whiskey distillery slop, for example, by maintaining the slop for about one half hour at a temperature of about 287° F., or for about twenty minutes at a temperature of about 297° F., or for about 10 minutes at a temperature of about 307° F. The slop is thereafter separated into solid and liquid components respectively. The temperature and duration of the converting step will, of course, vary somewhat with different slops, depending, for example, on the fineness of the grain and the extent of previous cooking.

The slop treated in accordance with the invention may be separated into solid and liquid constituents by filtration, e. g., through cloth, and the filtration may be effected with or without the use of filter aids.

In the treatment of distillery slop to remove insoluble constituents therefrom, the slop as it comes from the still has heretofore been screened by passing it over an eight-mesh screen, for example. When the screenings from such an operation are subjected to pressing or solvent extraction steps to remove vegetable oil therefrom, the pressing or solvent extraction is a relatively expensive and inefficient procedure, because of the very low proportion of vegetable oil contained in such screenings. An important object of the present invention consists in the treatment of distillery slop containing vegetable oil by a process in which separation is effected between certain of the insoluble constituents of the slop and the slop liquid, and in which the insoluble constituents so separated contain a very high ratio of vegetable oil as compared to the low ratio obtained by the prior art screening procedure. Thus, in the practice of the present invention, a fraction is obtained containing the insolubles of the slop and containing vegetable oil in a ratio which renders the recovery of such vegetable oil an economically desirable procedure. When the slop is converted to a condition of filterability as described above, and the converted slop is thereafter subjected to an operation such as filter pressing, centrifuging, gravity settling, or silk screening to remove its insoluble constitutents, the fraction removed by the last mentioned step of separation contains a high proportion of vegetable oil, thereby affording an economically desirable source for the extraction of said oil by expression or solution.

The manner in which the objects of the invention have been attained will be better understood by reference to the attached flow sheet, in which—

Figure 1 represents the preferred sequence of steps employed in the practice of the process, and Figure 2 represents an alternative embodiment of the invention.

In the following discussion, we shall assume that the distillery slop under treatment is obtained as a by-product of the manufacture of alcohol from corn. It is to be understood that this method of approach is adopted merely for the sake of simplicity of description and the invention is applicable to the filtration and separate recovery of values from the constituents of distillery slops obtained by the fermentation of other grains containing vegetable oils.

Referring to the flow sheet, distillery slop obtained by the manufacture of alcoholic products from corn and containing, for example, 6.5% solids, of which one-half are in solution and one-half in suspension, is first subjected to a converting operation in which it is heated for a substantial time. This operation is conducted under super-atmospheric pressure in an autoclave, as indicated at 11, as the application of elevated temperatures facilitates the rapid conversion of the slop into a state in which it may be filtered to produce a clear filtrate. The period of heating necessary to effect the desired conversion varies with the temperature and pressure employed in the heating operation. Thus, in the conversion of slop, obtained by the manufacture of whiskey from corn, the heating step should usually be continued for a period of approximately one-half hour at a temperature of 287° F., and under sufficient pressure to keep the slop liquid during the heating operation. Heating time may be reduced to twenty minutes in case a temperature of 297° F., is employed, or it may be reduced to ten minutes in case of a temperature of 307° F., is employed.

In accordance with this invention the heating operation is conducted under pressure sufficient to maintain the slop liquid at the temperature employed. If the heating operation is conducted at temperatures substantially lower than 240° F. the heating operation must be conducted for a period of at least several hours in order to effect the desired conversion of slop obtained from corn. Such a prolonged heating step is undesirable for several reasons. In the first place, such heating is very wasteful because of the long period over which it must be performed as contrasted with the shorter heating step required at higher temperatures and particularly temperatures such as 287° to 307° F. In the second place, a part of the neutral oil is hydrolyzed to produce glycerine and fatty acids during the heating step. In cases in which this heating step must be conducted for a long period of time, this undesired hydrolysis proceeds to a very objectionable extent. A certain amount of hydrolysis is inevitable in connection with the heating step of the process of the present application, regardless of the temperature to which it is carried, but in cases in which the temperature is so low that the heating step must be conducted for many hours, this hydrolysis converts a very large proportion of the neutral oil into fatty acids and also greatly impairs the value of the filter cake as a source of feed for live stock.

In the treatment of typical distillery slops obtained from corn it has been found that the desired conversion can be attained in connection with a heating step of one hour at temperatures of 259° F., and in one and one-half hours at temperatures of 250° F. By the employment of this heating operation, the slop is converted into a state in which it can be filtered through cloth or equivalent filter medium without resulting in the cloggage of the filter medium which would be inevitable if this heating step were not employed.

Although a heating step is ordinarily performed upon slop incident to the distillation of alcohol and other constituents from such slop, that heating step is not continued for a sufficient length of time to effect the conversion at the temperatures employed, which is attained by the heating step discussed above. In the practice of the present invention the slop is subjected to an additional heating step before or after the distilling operation in order to convert it into a filterable state.

The converted slop is preferably subjected to a screening operation before filtration to remove the coarser insoluble impurities. This screening operation may consist in the passage of the slop through an eight mesh screen 10. The insolubles removed by the screen may thereafter be subjected to a separate operation for the recovery of the corn oil, which they contain. The proportion of corn oil in the insolubles so removed is, however, very small (about 3% on a dry basis), and the economics of recovering corn oil therefrom are not usually sufficiently favorable to render such recovery desirable. It is ordinarily preferable therefore, that these solids be dried and used as cattle feed.

After the slop is subjected to the heat converting step in the autoclave 11, it is subjected to a separating operation to obtain, as separate fractions, slop solids and a clear liquid. It may, for example, be filtered through cloth or equivalent medium by passage through the filter 12. It is important in this connection to note that it is not feasible to effect a filtering operation of this character unless the converting step has been previously performed. The filter cake is preferably washed with water in cases in which oil is to be recovered therefrom. The filter cake from the filter 12 is preferably passed to a heat drier 13 in which its moisture is removed and is then passed from the drier to an oil expeller 14 which may be a press of any suitable type ordinarily employed in the vegetable oil industry.

By the performance of the steps described above, a filter cake is obtained which contains a very large proportion of corn oil, e. g., 25%. The mechanical expression of oil from solids of this high oil content is an economically desirable procedure.

In the above discussion, the separation of slop solids from the liquid content of the slop has been described as a filtering operation. It is to be understood that other methods of effecting this separation may be substituted for the filtering step, as the converting step, constituting the first and critical step of the process, conditions the slop for separation of insolubles from liquid by other means, such as centrifugal separation or settling, as well as filtration. The converting step renders subsequent separation by filtration or otherwise possible by causing an agglomeration of some of the dispersed particles which impede separation into larger particles. At the same time, other parts of the suspended solids are thrown into solution in the liquid. The materials which would otherwise preclude efficient separation are thus partly dissolved and partly agglomerated and the resulting slop can be filtered, centrifuged, settled, or screened through cloth to produce solids fraction of high vegetable oil content.

While the operation of screening the slop to separate coarse insoluble impurities therefrom on the screen 10 has been described above as occurring before the step of pressure conversion, this step of screening may be performed after pressure conversion and before filtration if desired. The insolubles removed from the filter press 12 may, instead of being subjected to a step of pressing to remove vegetable oil, be extracted by any suitable solvent or combination of solvents to remove their vegetable oil contents.

Figure 2 of the drawings illustrate an alternative embodiment in which the coarser insoluble impurities are removed after heating to effect the pressure conversion step discussed above, and the oil extracted by a solvent process instead of being pressed. In this embodiment, the slop is first subjected to pressure conversion in the autoclave 20, this converting step being similar to the converting step described above in connection with the autoclave 11. The converted slop is then passed over a screen 21 to remove coarse insoluble impurities and is passed to a filter 22 similar to the filter 12, or equivalent means, for separating coagulated insoluble impurities from the slop. The filter cake is then washed with water, and passed to a drier 23 similar to the drier 13. From the drier the solids are passed to a vessel 24, where they are extracted by means of any suitable solvent, such as ether, acetone, trichlor ethylene or hexane. The suspension of solids in the solution of oil in the solvent is then passed to a filter 25 for removing the insoluble constituents therefrom in the form of a filter cake. The filtrate from the filter 25 is then passed to a still 26 for removal of the solvent and recovery of the oil separated from the slop solids by solvent extraction in the vessel 24.

In a specific example of the practice of the invention, distillery slop of the type described above was converted by heating for thirty minutes at a temperature of 287° F. in an autoclave under sufficient pressure to keep the slop liquid while the same was being heated. No reagents were used in connection with the converting operation. The material from the autoclave was then passed through an eight mesh screen and 0.65% solids were removed by this screen. These removed solids contained 3% corn oil. The material passing through the screen was then passed through a filter which effected removal of 2.6% solids. These solids were passed through a drier to an expeller, where they were subjected to a pressing operation to effect removal of oil. The solids before pressing were found to contain 25% corn oil.

Still further modifications will be obvious to those skilled in the art and I do not therefore desire to be limited except by the scope of the subjoined claims.

I claim:

1. The process of treating distillery slop containing vegetable oil which comprises heating the slop under pressure to a temperature in excess of 250° F. for a period of time not in excess of one and one-half hours until said slop has been converted to a state in which it can be filtered through cloth, and thereafter filtering said converted slop and recovering oil from the filter cake by a pressing operation.

2. The process of treating distillery slop containing vegetable oil which comprises heating the slop under pressure to a temperature in excess of 250° F. for a period of time not in excess of one and one-half hours until said slop has been converted to a state in which it can be filtered through cloth, thereafter filtering said converted slop, drying the filter cake and recovering the oil therefrom by a pressing operation.

3. The process of treating distillery slop which comprises heating the slop under pressure to a temperature in excess of 250° F. for a period of time not in excess of one and one-half hours until said slop has been converted to a state in which it can be filtered through cloth, screening the converted slop, filtering the converted and screened slop and pressing the filter cake to recover vegetable oil therefrom.

4. The process of treating distillery slop containing vegetabale oil which comprises heating the slop under pressure to a temperature in excess of 250° F. for a period not in excess of one and one-half hours until said slop has been converted to a state in which it can be filtered through cloth, filtering said converted slop, and thereafter recovering vegetable oil from the filter cake by solvent extraction.

5. The process of treating distillery slop, containing vegetable oil which comprises heating the slop to a temperature in excess of 250° F. for a period of time not in excess of one and one-half hours until an agglomeration of its insoluble constituents has been attained, thereafter separating said insoluble constituents from the slop to obtain its insoluble constituents on the one hand and a liquid effluent on the other hand, and separating vegetable oil from said separated insoluble constituents.

6. The process of treating distillery slop containing vegetable oil which comprises heating the slop to a temperature in excess of 250° F. for a period of time not in excess of one and one-half hours until an agglomeration of its insoluble constituents has been attained, thereafter separating by centrifugal force said insoluble constituents on the one hand and a liquid effluent on the other hand, and separating vegetable oil from said separated insoluble constituents.

7. The process of treating distillery slop which comprises heating the slop to a temperature in excess of 250° F. for a period of time not in excess of one and one-half hours until an agglomeration of its insoluble constituents has been attained and thereafter separating by gravity subsidence said insoluble constituents from the slop to obtain the insoluble constituents on the one hand and a liquid effluent on the other hand, and separating vegetable oil from said separated insoluble constituents.

CHARLES R. BROWN.